(12) United States Patent
Bangs et al.

(10) Patent No.: US 9,253,590 B2
(45) Date of Patent: Feb. 2, 2016

(54) NEAR FIELD COMMUNICATOR IMPLEMENTING SWITCHED CIRCUIT STATES FOR DEMODULATION

(71) Applicant: Broadcom Europe Limited, Cambridge (GB)

(72) Inventors: Joakim Bangs, Swindon (GB); Paul Butler, Chippenham (GB)

(73) Assignee: Broadcom Europe Limited, Cambridge (GB)

( * ) Notice: Subject to any disclaimer, the term of this patent is extended or adjusted under 35 U.S.C. 154(b) by 244 days.

(21) Appl. No.: 13/797,242

(22) Filed: Mar. 12, 2013

(65) Prior Publication Data

US 2013/0189926 A1    Jul. 25, 2013

Related U.S. Application Data

(63) Continuation of application No. 12/670,320, filed as application No. PCT/GB2008/002528 on Jul. 23, 2008, now Pat. No. 8,422,946.

(30) Foreign Application Priority Data

Jul. 23, 2007   (GB) .................................... 0714348

(51) Int. Cl.
*H04B 5/00*     (2006.01)
*H04W 4/00*    (2009.01)

(52) U.S. Cl.
CPC ............... *H04W 4/008* (2013.01); *H04B 5/00* (2013.01); *H04B 5/0031* (2013.01); *H04B 5/0081* (2013.01)

(58) Field of Classification Search
CPC ............... G11C 27/02–27/028; H04W 4/008; H04B 5/00–5/02

USPC .............................. 455/41.1; 375/324; 327/94
See application file for complete search history.

(56) References Cited

U.S. PATENT DOCUMENTS 5,363,055 A    11/1994  Ribner
5,453,757 A    9/1995   Date et al.
(Continued)

FOREIGN PATENT DOCUMENTS

GB    2441051 A    *  2/2008
GB    2451342 B       9/2009
(Continued)

OTHER PUBLICATIONS

Gregorian, R., "Switched-Capacitor Circuit Design", Aug. 1983, Proceedings of the IEEE2, vole. 71, No. 8, p. 955.
(Continued)

*Primary Examiner* — Gennadiy Tsvey
(74) *Attorney, Agent, or Firm* — Sterne, Kessler, Goldstein & Fox P.L.L.C.

(57) ABSTRACT

A near field RF communicator has an inductive coupler to couple inductively to an H field of an RF signal from another near field RF communicator in near field range to provide a received signal, a demodulator coupled to extract any modulation from a source signal representing a received RF signal to provide an extracted modulation signal; and a controller coupled to receive an extracted modulation signal from the demodulator. The demodulator has a sampler to sample the source signal in sampling periods and to compare signal samples with at least one of other signal samples and a clock or reference signal to remove or reject the carrier of the received RF signal and to extract the modulation.

20 Claims, 6 Drawing Sheets (56) References Cited

U.S. PATENT DOCUMENTS

| | | |
|---|---|---|
| 2004/0213169 A1 | 10/2004 | Allard et al. |
| 2005/0056704 A1 | 3/2005 | Kim |
| 2006/0038024 A1 | 2/2006 | Nakadai et al. |
| 2006/0238301 A1 | 10/2006 | Wu et al. |
| 2007/0026825 A1 | 2/2007 | Wilson |
| 2012/0028574 A1 | 2/2012 | Bangs et al. |

FOREIGN PATENT DOCUMENTS

| | | |
|---|---|---|
| WO | WO 2006/095186 A1 | 9/2006 |
| WO | WO 2006/110000 A1 | 10/2006 |
| WO | WO 2008/071925 A1 | 6/2008 |
| WO | WO 2008/117029 A2 | 10/2008 |
| WO | WO 2009/013495 A2 | 1/2009 |

OTHER PUBLICATIONS

Liu, M., "Demystifying Switched-Capacitor Circuits", 2006, Elsevier Inc., p. 184.

Seng-Pan U, "Design of Very High-frequency Multirate Switched-Capacitor Circuits", 2006, Springer, p. 82-83.

International Search Report for International Application No. PCT/GB2008/002528, European Patent Office, Netherlands, mailed on Feb. 24, 2009.

Written Opinion of the International Searching Authority for International Application No. PCT/GB2008/002528, European Patent Office, mailed Jan. 23, 2010.

\* cited by examiner

NEAR FIELD COMMUNICATOR IMPLEMENTING SWITCHED CIRCUIT STATES FOR DEMODULATION

CROSS REFERENCE TO RELATED APPLICATIONS

This application is a continuation of U.S. application Ser. No. 12/670,320, filed on Jan. 22, 2010, now U.S. Pat. No. 8,422,946, which is a national stage entry of International Application PCT/GB2008/002528, filed on Jul. 23, 2008, and claims priority to International Application GB 0714348.0, filed on Jul. 23, 2007, each of which is hereby incorporated by reference in its entirety.

FIELD OF DISCLOSURE

This invention relates to near field RF communicators and near field communications enabled devices.

RELATED ART

Near field RF (radio frequency) communication requires an antenna of one near field RF communicator to be present within the alternating magnetic field (H field) generated by the antenna of another near field RF communicator by transmission of an RF signal (for example a 13.56 Mega Hertz signal) to enable the magnetic field (H field) of the RF signal to be inductively coupled between the communicators. The RF signal may be modulated to enable of communication control and/or other data. Ranges of up to several centimeters (generally a maximum of 1 meter) are common for near field RF communicators.

Near field communication may be referred to as near-field RFID (Radio Frequency Identification) or near-field communication. NFC communicators are a type of near field RF communicator that is capable of both initiating a near field RF communication (through transmission or generation of an alternating magnetic field) with another near field RF communicator and of responding to initiation of a near field RF communication by another near field RF communicator. The term "near field RF communicator" includes not only NFC communicators but also initiating near field RF communicators such as RFID transceivers or readers (referred to below as RFID readers) that are capable of initiating a near field RF communication but not of responding to initiation of a near field RF communication by another near field RF communicator and responding near field RF communicators such as RFID transponders or tags (referred to below as RFID tags) that are capable of responding to initiation of a near field RF communication by another near field RF communicator but not of initiating a near field RF communication with another near field RF communicator. Hence NFC communicators can act as both RFID transceivers and RFID transponders and are able to communicate with other NFC communicators, RFID transceivers and RFID transponders.

As will be understood from the above, an NFC communicator may operate in an "initiator" mode in which the NFC communicator seeks to initiate near field RF communication or in a "target" mode in which the NFC communicator is receptive to initiation of near field RF communication. NFC communicators may also operate in either a "passive communications mode" or an "active communications mode". When communication is by the "passive communications mode" an initiator NFC communicator will generate an RF field and a target NFC communicator will respond by modulation of the received RF signal, usually by load modulation. When communication is by the "active communications mode" both the initiator NFC communicator and the target NFC communicator use their own RF field to enable communication. The terms "passive" and "active" in the context of NFC communicators do not have the same meaning as "passive" and "active" when used in the context of traditional RFID tags and readers where the terms are instead used to define whether the RFID tags and readers have their own power supply or whether a power supply is derived from the received HF field.

Examples of near field RF communicators are defined in various standards for example ISO/IEC 18092, ISO/IEC 14443, ISO/IEC 15693 ISO/IEC 21481. Examples of NFC communicators can be found in ISO/IEC 18092 and ISO/IEC 21481 in particular.

Near field RF communicators may be provided as standalone or discrete devices or may be incorporated within or coupled to larger electrical devices or host devices (referred to below as near field RF communications enabled devices) to enable those devices to communicate by the near field with other near field RF communicators or devices incorporating or coupled to such near field RE communicators. When incorporated within a larger device or host, a near field RF communicator may be a discrete entity or may be provided by functionality within the larger device or host. Examples of such larger devices or host devices are, for example, mobile telephones, portable computing devices (such as personal digital assistants, notebooks, lap-tops), other computing devices such as personal or desk top computers, computer peripherals such as printers, or other electrical devices such as portable audio and/or video players such as MP3 players, IPODs®, CD players, DVD players.

NFC communicators need to be able to respond to a variety of different modulation protocols. For example under the ISO/1EC standards NFC communicators need to be able to detect and demodulate modulation at 10% and 100% amplitude and modulation protocols with different timing requirements. For example ISO/IEC 14443A requires detection of modulation pulses at 590ns whereas ISO/IEC 15693 requires detection of modulation pulses at 944 us. The NFC communicator therefore needs to be able to accurately detect and respond to varying protocols.

Existing modulation detection schemes/demodulation schemes often look at the peaks and troughs in any received modulated RF signal and use those peaks and troughs to calculate a threshold (for example the peak and trough voltage levels may be determined and averaged to get a threshold) which then can be used to establish the modulation scheme being used and as a result the applicable protocol. However this procedure provides limited information and may not be able to detect between different modulation schemes An aspect of the present invention provides a near field RF communicator, that alleviates at least some of the aforementioned problems.

An aspect of the present invention provides a near field RF communicator for communicating with another near field RF communicator, the near field RE communicator comprising:

an inductive coupler operable to couple inductively to an H field of an RF signal from another near field RF communicator in near field range; and a demodulator to sample a source signal representing the coupled RF signal and to compare a signal sample with at least one of: another signal sample; and a clock or reference signal, so as to remove the carrier of the received RF signal, thereby extracting the modulation.

In an embodiment the demodulator is configured to compare successive signal samples, In an embodiment the demodulator comprises at least one capacitor configured to be charged in successive sampling periods to provide a voltage representing the voltage change in the source signal between those successive sampling periods.

In an embodiment the demodulator comprises a sampler having at least one input to receive a source signal and a demodulator controller to cause the sampler to sample a source signal in one of first and second sampling states and to compare the sampled signal with another sample of the source signal, a clock or a reference signal in the other of the first and second states.

In an embodiment the demodulator comprises a sampler having at least one input to receive a source signal, a sample capacitor and an output capacitor, and a demodulator controller to cause the sampler to operate in first and second sampling states such that, in the first sampling state, the output capacitor is charged or discharged in accordance with at least one reference voltage and the sample capacitor is charged in accordance with a voltage of the source signal received at the at least one input, and in the second sample state any change in the voltage of the source signal causes charge to move from the sample capacitor to the output capacitor to enable a voltage to be provided which represents the change in the source signal between successive samples of the source signal.

In an embodiment the demodulator comprises a sampler having at least one input to receive a source signal, a sample capacitor and an output capacitor, and a demodulator controller to cause the sampler to switch between the first and second sampling states or configurations, wherein in the first configuration the sampler is arranged to: take a first sample of a source signal received at the at least one input; and to store charge on the sample capacitor, the stored charge being related to the source signal and a first reference voltage; and to store a charge on the output capacitor, the stored charge being related to the first reference voltage and to a second reference voltage, and in the second configuration the sampler is arranged to: take a second sample of a source signal received at the at least one input whereby any change in the source signal between the first and second samples causes charge to move from the sample capacitor to the output capacitor to enable a voltage to be provided which represents the change in the source signal between the first and second configurations.

In another embodiment the demodulator comprises a demodulator controller and a sampler having at least one input to receive at least one source signal and an output, wherein the input is coupled via at least one first switch and a sample capacitor to an inverting input of an amplifier, the other input of which is coupled to a first reference voltage source, the output of the amplifier is coupled to provide an output of the sampler, the output of the amplifier is coupled to its inverting input via a second switch and the output of the amplifier is coupled via a third switch to one plate of an output capacitor having its other plate coupled to the inverting input of the amplifier, the one plate of the output capacitor being coupled via a fourth switch to a second reference voltage source, wherein the demodulator controller is configured to cause the sampler to switch between a first sampling state in which the first, second and fourth switches are closed or conducting and a second sampling state in which the first and third switches are closed or conducting.

In an embodiment two frst switches are provided in parallel and the modulation extraction controller is configured to close one of the first switches in the first state and to close the other of the first switches in the second state.

In an embodiment the demodulator controller is configured to cause break before make when switching between the first and second configurations.

In an embodiment the source signal comprises one or more of: a signal direct from the received RF signal, a signal from a signal envelope detector, a signal from a regulator circuit; and a signal from an AC supply rectifier. In these embodiments and others the demodulator is coupled to sample differential source signals or a near field RF communicator may further comprise at least one of: one or more filters to filter the source signal; a device to control a slew of the source signal. Embodiments of a near field RF communicator may farther comprise a voltage threshold detector coupled to provide a thresholded output representing the extracted modulation.

In an embodiment the voltage threshold detector comprises an n-bit digitizer which may be a single input or differential digitizer.

A controller of the near field RF communicator may be arranged to determine a modulation scheme being used by the other near field RF communicator from a modulation signal provided by the demodulator. A controller of the near field RF communicator may be arranged to determine the data carried by a coupled RF signal from a modulation signal provided by the demodulator. The inductive coupler may comprise a single-ended or differential antenna circuit. The demodulator may comprise a single-ended or differential circuit. The near field RF communicator may be an NFC communicator.

An aspect of the invention provides a near field RF communicator comprising a demodulator to sample a received RF signal at frequent intervals and to use the change in such samples to detect incoming modulation.

An aspect of the invention provides a near field RF communicator comprising a modulation detection circuit operable to sample a received RF signal at frequent intervals and detect the change in such samples wherein such change detection is representative of a change in the received RF signal.

An aspect of the present invention provides a modulation detection circuit or a near field RF communicator comprising such a modulation detection circuit, wherein the modulation detection circuit comprises at least one input to receive a signal representing directly or indirectly a received RF signal, at least one capacitor and at least one voltage change detector wherein the voltage change detector is operable to detect a change in voltage across the said capacitor, such change in voltage representing a change in the voltage at the at least one input.

In an embodiment, the at least one capacitor is charged in accordance the signal at the voltage at least one input and the voltage change detector is operable to detect a change in the voltage across the at least one capacitor.

In an embodiment, a received RF signal is directly or indirectly sampled and a change in voltage between successive samples causes a change in the charge stored on at least one capacitor so that a voltage across the at least one capacitor represents the change in voltage between successive samples.

An aspect of the invention provides a near field RF communicator for communicating with another near field RF communicator, the near field RF communicator comprising:

an inductive coupler operable to couple inductively to an H field of an RF signal from another near field RF communicator in near field range to provide a received signal;

a modulation extractor coupled to extract any modulation from a source signal representing a received RF signal to provide an extracted modulation signal; and a controller coupled to receive an extracted modulation signal from the modulation extractor, wherein the modulation extractor is configured to sample the source signal in sampling periods and to compare signal samples with at least one of other signal samples and a clock or reference signal to remove or reject the carrier of the received RF signal, thereby extracting the modulation.

In an embodiment, the modulation extractor comprises a modulation extractor controller and a sampler having at least one input to receive at least one source signal and an output, wherein the input is coupled via at least one first switch and a sample capacitor to an inverting input of an amplifier, the other input of which is coupled to a first reference voltage source, the output of the amplifier is coupled to the output of the sampler, the output of the amplifier is coupled to its inverting input via a second switch and the output of the amplifier is coupled via a third switch to one plate of an output capacitor coupled to the inverting input of the amplifier, the other plate of the output capacitor being coupled via a fourth switch to a second reference voltage source, the modulation extractor controller being configured to cause the sampler to switch between a first state in which the first, second and fourth switches are closed or conducting and a second state in which the first and third switches are closed or conducting.

In an embodiment, the samples are taken or the least one input is coupled to receive a signal: directly from the received RF signal, from a signal envelope detector, from a regulator circuit or from an AC supply rectifier, or any from combination of the foregoing.

In an embodiment, the voltage change detector is arranged to respond only to a change in voltage over a pre-determined threshold. The voltage change detector may convert the change in voltage to a digital signal. In an embodiment the voltage change detector is an n-bit digitizer.

A controlled slew circuit may be provided to control slew in the signal received at the at least one input.

The near field RF communicator may be an NFC communicator. The near field RF communicator may comprise part of, be provided within, or be associated with a host, to provide a near field RF communications enabled devices comprising a near field RF communicator.

With reference to the drawings in general, it should be understood that any functional block diagrams are intended simply to show the functionality that exists within the device and should not be taken to imply that each block shown in the functional block diagram is necessarily a discrete or separate entity. 'The functionality provided by a block may be discrete or may be dispersed throughout the device or throughout a part of the device. In addition, the functionality may incorporate, where appropriate, hard-wired elements, software elements or firmware elements or any combination of these. The NFC communicator may be provided wholly or partially as an integrated circuit or collection(s) of integrated circuits.

DETAILED DESCRIPTION OF THE DISCLOSURE

In embodiments to be described below, a near field RF communicator has an inductive coupler to couple inductively to an H field of an RF signal from another near field RF communicator in near field range to provide a received signal, a modulation extractor to extract any modulation from a source signal representing a received RF signal to provide an extracted modulation signal; and a controller to receive an extracted modulation signal from the modulation extractor. The modulation extractor has a sampler to sample the source signal in sampling periods and to compare signal samples with at least one of other signal samples and a clock or reference signal to remove or reject the carrier of the received RF signal and to extract the modulation.

Figure 1:
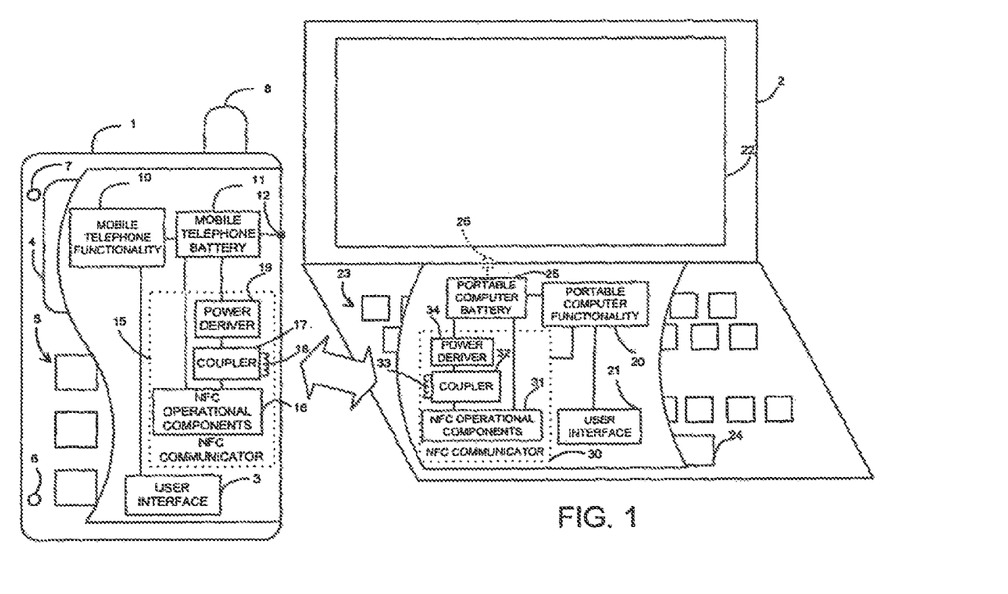
FIG. 1 shows a representational diagram illustrating communication between two devices comprising NFC communicators.

As shown in FIG. 1, an NFC communications enabled device comprises a mobile telephone (cellphone) 1 and another NFC communications enabled device comprises a portable computer 2, such as a notebook or laptop computer.

The mobile telephone 1 has the usual features of a mobile telephone including mobile telephone functionality 10 (in the form of, usually, a programmed controller, generally a processor or microprocessor with associated memory or data storage, for controlling operation of the mobile telephone in combination with a SIM card), an antenna 8 for enabling connection to a mobile telecommunications network, and a user interface 3 with a display 4, a keypad 5, a microphone 6 for receiving user voice input and a loudspeaker 7 for outputting received audio to the user. The mobile telephone also has a chargeable battery 11 coupled to a charging socket 12 via which a mains adapter (not shown) may be connected to enable charging of the battery 11. The mobile telephone 1 may have an alternative or additional power supply (not shown), for example a reserve battery or emergency battery.

Similarly the portable computer 2 has the usual features of a portable computer including portable computer functionality 20 in the form of, usually, a processor with associated memory in the form of ROM, RAM and/or hard disk drive, one or more removable media drives such as a floppy disk drive and/or a CDROM or DVD drive, and possibly a communications device for enabling the portable computer to connect to a network such as the Internet. The portable computer 2 also includes a user interface 21 including a display 22, a keyboard 23 and a pointing device, as shown a touchpad 24. The portable computer 2 also has a chargeable battery 25 coupled to a charging socket 26 via which a mains adapter (not shown) may be connected to enable charging of the battery 25.

In addition, as shown in FIG. 1, both NFC communications enabled devices 1 and 2 have an NFC communicator 15 and 30. As shown, the NFC communicators 15 and 30 are incorporated within the larger devices and, as with the other functional blocks, may be discrete entities within the host devices or may be provided by features dispersed throughout or integrated within the host device or a part of the host device.

Each NFC communicator 15 and 30 comprises NFC operational components 16 and 31 for, as will be described below, enabling control of the NFC functionality and generation, modulation and demodulation of an RF signal. Each NFC communicator 15 and 30 also comprises a coupler 17 and 32 comprising an inductor or coil in the form of an antenna 18 and 33. The couplers 17 and 32 enable an alternating magnetic field (H field) generated by the antenna of one near field RF communicator 15 (or 30) by transmission of an RF signal (for example a 13.56 Mega Hertz signal) to be inductively coupled to the antenna of the other near field RF communicator 30 (or 15) when that antenna is within the near field of the RF signal generated by the one near field RF communicator 15 (or 30).

The NFC communicators 15 and 30 are coupled to the mobile telephone and portable computer functionality 10 and 20, respectively, to enable data and/or control commands to be sent between the NFC communicator and the host device and to enable user input to the NFC communicator. Communication between the user interface 3 or 21 and the NFC communicator 15 or 30 is via the host device functionality 10 or 20, respectively.

Each NFC communicator 15 and 30 also comprises a power provider 19 and 34. The power providers 19 and 34 may be power supplies within the host device or specific to the NFC communicators 15 and 30, for example a button cell battery, or other small battery. As another possibility or additionally as shown by dashed lines in FIG. 1, one or both of the power providers 19 and 34 may simply comprise a coupling to derive power from the corresponding device battery 11 or 25.

It will be appreciated that FIG. 1 shows only examples of types of host devices. A host device may be another type of electrical device such as a personal digital assistant (PDA), other portable electrical device such as a portable audio and/or video player such as an MP3 player, an IPOD®, CD player, DVD player or other electrical device.

Also, rather than being incorporated within the host device, the NFC communicator 15 or 30 may be associated with the host device, for example by a wired or wireless coupling. In such a case, a housing of the NFC communicator may be physically separate from or may be attached to the housing of the host device; in the latter case, the attachment may be permanent once made or the NFC communicator may be removable. For example, the NFC communicator may be housed within: a housing attachable to another device; a housing portion, such as a fascia of the NFC communications enabled device or another device; an access card; or may have a housing shaped or configured to look like a smart card. For example an NFC communicator may be coupled to a larger device by way of a communications link such as, for example, a USB link, or may be provided as a card (for example a PCMCIA card or a card that looks like a smart card) which can be received in an appropriate slot of the larger or host device.

In addition, one or both of the NFC communications enabled devices may be a standalone NFC communicator, that is it may have no functionality beyond its NFC communications functionality.

Figure 2:
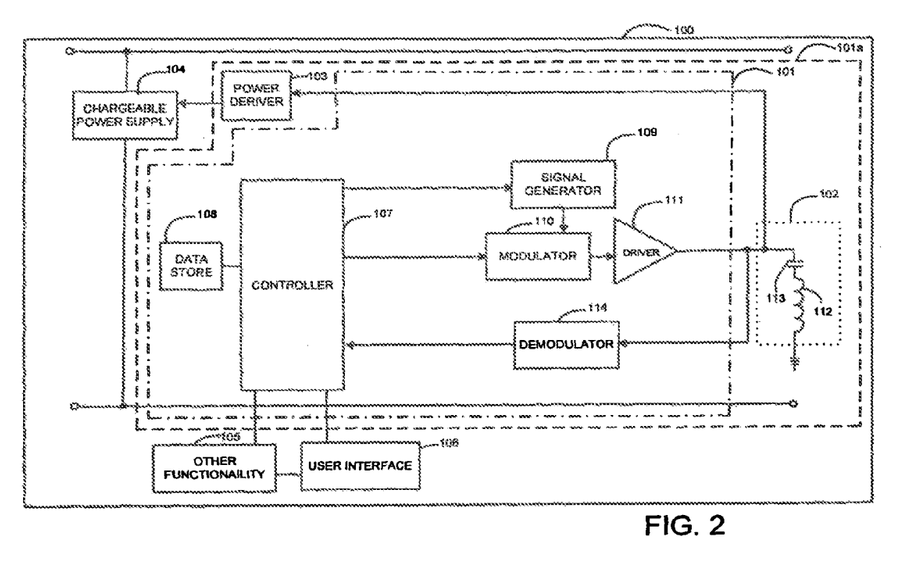
FIG. 2 shows a functional block diagram of an NFC communicator according to an aspect of the present invention.

FIG. 2 shows a functional block diagram of an NFC communications enabled device 100 in accordance with the invention to illustrate in greater detail one way in which the NFC operational components of an NFC communications enabled device embodying the invention may be implemented.

In this example, the NFC communications enabled device 100 comprises an NFC communicator 101a having NFC operational components including an inductive coupler 102, power provider 104, controller 107, data store 108, signal generator 109 and demodulator 114.

In the example shown in FIG. 2, the inductive coupler 102 comprises antenna circuit components 112 and 113. The design of the inductive coupler will depend on the NFC communicator and local environment within which the NFC communicator is intended to operate. The power provider 104 may be any one or more of the types of power providers discussed above. In the interests of simplicity, power supply couplings from the power provider 104 to other components are not shown in FIG. 2.

The NFC communications enabled device 100 may or may not also have or be capable of being connected or coupled with at least one of other functionality 105 (for example functionality of a host device such as described above) and a user interface 106.

The NFC operational components also include a demodulator 114 coupled between the inductive coupler 102 and the controller 107 for demodulating a modulated RF signal inductively coupled to the coupler 102 from another near field RF communicator in near field range and for supplying the thus extracted data to the controller 107 for processing. An amplifier (not shown) may be coupled (before or after the demodulator) between the inductive coupler 102 and the controller 107. The demodulator is also responsible detecting the modulated signal (for example will comprise a signal envelope detector) and communicating such detection and the resulting demodulated signal to the controller 107. The amplifier may form a part of the demodulator or form a separate functional block.

In addition the NFC operational components include components for enabling modulation of an RF signal to enable data to be communicated to another near field RF communicator in near field range of the NFC communicator 101a. As shown in FIG. 2, these components comprise a signal generator 109 coupled via a driver 111 to the coupler 102. In this example, the modulator 110 causes modulation by gating or switching on and off the RF signal in accordance with the data to be communicated. The NFC communicator may use any appropriate modulation scheme that is in accordance with the standards and/or protocols under which the NFC communicator operates. Alternatively a separate or further signal controller may be incorporated within the NFC operational components to control modulation of the signal generated by the signal generator 109 in accordance with data or instructions received from the controller 107.

The NFC operational components also include a controller 107 for controlling overall operation of the NFC communicator. The controller 107 is coupled to a data store 108 for storing data (information and/or control data) to be transmitted from and/or data received by the NFC communications enabled device. The controller 107 may be a microprocessor, for example a RISC processor or other microprocessor or a state machine. Program instructions for programming the controller and/or control data for communication to another near field RF communicator may be stored in an internal memory of the controller and/or the data store.

The NFC communicator 101a may operate in an initiator mode (that is as an initiating near field RF communicator) or a target mode (that is as a responding near field RF communicator), dependent on the mode to which the NFC communicator is set. The mode may be determined by the controller 107 or may be determined in dependence on the nature of a received near field RF signal. When in initiator mode, an NFC communicator initiates communications with any compatible responding near field RF communicator capable of responding to the initiating NFC communicator (for example an NFC communicator in target mode or an RFID tag or transponder) that is in its near field range, while when in target mode an NFC communicator waits for a communication from a compatible initiating near field RF communicator (for example an NFC communicator in initiator mode or an RFID initiator or transceiver). As thus used, compatible means operable at the same frequency and in accordance with the same protocols, for example in accordance with the protocols set out in various standards such as ISO/IEC 18092, ISO/IEC 21481, ISO/IEC 14443 and ISO/IEC 15693.

When in initiator or target mode, the NFC communicator may communicate in accordance with an active or passive protocol. When using an active protocol the initiating NFC communicator will transmit an RF field and following completion of its data communication turn off its RF field. The responding near field RF communicator (target) will then transmit its own RF field and data before again turning off the RF field and so on. When using a passive protocol the NFC communicator (initiator) will transmit and maintain its RF field throughout the entire communication sequence. The protocol used will depend on instructions received from the controller 107 and the response received from a responding near field RF communicator.

The near field RF communicator has a modulation extractor or modulation detection circuitry which may be provided as part of the demodulator 114 or may be separate functionality. In the example shown in FIG. 2, the modulation detection circuitry forms part of the demodulator.

Figure 2A:
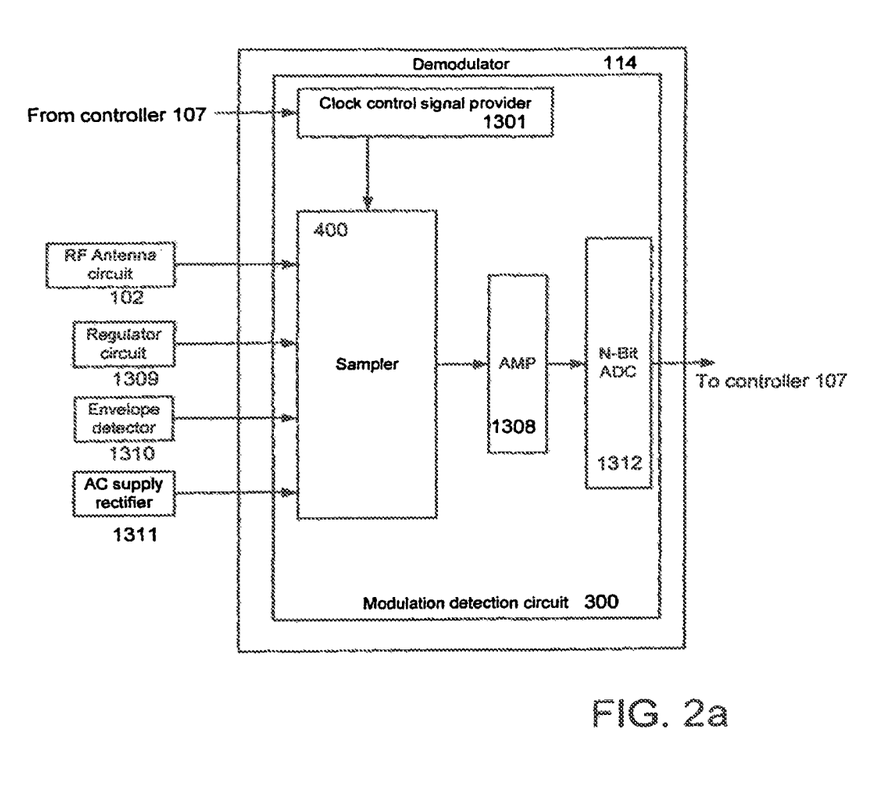
FIG. 2a shows a functional block diagram to illustrate at least some of the functionality of the demodulator shown in FIG. 2.
Figure 3:
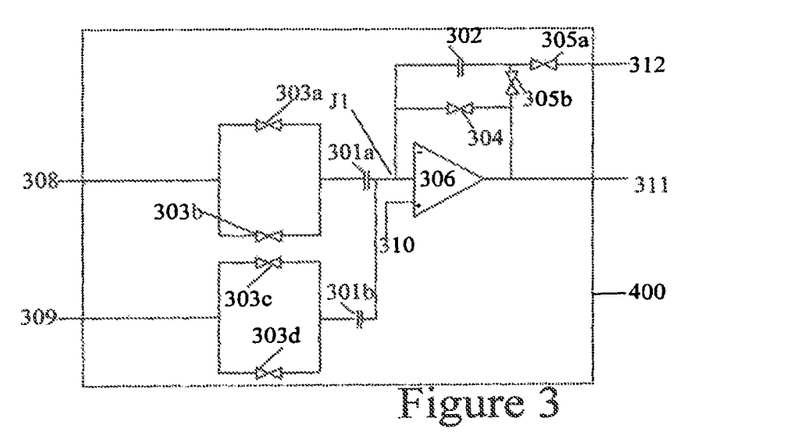
FIG. 3 shows a functional block diagram of a modulation detection circuit embodying the invention.

FIG. 2a shows a functional block diagram to illustrate at least some of the functionality of an example of a modulation detection circuit 300 while FIG. 3 shows a functional block diagram of an example of a sampler 400 of the modulation detection circuit 300.

The sampler 400 has one or more inputs coupled to receive one or more signals representing, directly or indirectly, the signal to be demodulated from one or more different locations within the near field RF communicator, that is from any location or circuit of the near field RF communicator that provides a voltage signal which is representative of the RF signal received by antenna circuit 112 (FIG. 2). For example, as shown in FIG. 2a, the modulation detection circuit 300 may receive the modulated RF signal from any one or more of: the antenna circuit 102 and the power providing functionality of the near field RF communicator (that is the power deriver 103 and/or chargeable power supply 104). In the latter case, as shown in FIG. 2a, the modulated RF signal may be obtained from, for example, any one or more of an envelope detector 1310, an AC supply rectifier 1311 and a regulator circuit 1309 (which protects functional components of an NFC communicator from high voltages) of the power providing functionality.

In a preferred example, at least one input of the modulation detection circuit 300 is taken from the regulator circuit 1309 and at least one input is taken from the envelope detector 1310. Multiple inputs or samples may be taken from the same source or location. Although not explicitly shown in FIG. 2a, in some examples a smoothing filter may be included to smooth the signal prior to input to the sampler 400.

As illustrated by FIG. 2a, in addition to the sampler 400, the modulation detection circuit 300 has a clock provider 1301 or modulation extractor controller to provide a clocking or switching signal for the sampler 400 to enable sampling of the modulated RF signal (demodulator input(s)). As will be appreciated by those skilled in the art, generally the sampling frequency should exceed the Nyquist limit for the signal being sampled, although sub-Nyquist sampling may be possible. The clock signal may be derived from the clock of the controller 107, from the carrier RF signal, supplied or derived from an external clock signal provided by a host of the near field RF communicator or the clock provider 1301 itself may generate the clock signal. Combinations of these may be possible. As another possibility, the clock provider may be part of the controller 107.

The sampler 400 is configured to sample a received modulated RF signal at a frequency or sampling rate determined by the clock provider and to compare successive samples against one another, thereby rejecting the RF carrier and so extracting the modulation.

The modulation detection circuit 300 also has a voltage change detector to detect voltage changes above a given threshold or thresholds which may be set such that small changes may be ignored as irrelevant while large changes can be interpreted as indicative of received modulation. As examples, the measured modulation width may be 10% modulation width or 100% modulation width, or another modulation width.

In this example, the voltage change detector is an N-bit ADC (Analog to Digital Converter) 1312. The voltage change detector provides a digital output which represents the extracted modulation. This digital output may then be processed by the controller 107 to determine at least one of information relating to the modulation scheme and the data carried by the modulation. An amplifier 1308 may be provided to amplify the output of the sampler 400 and the amplified output may be input to a Schmitt trigger to convert output pulses from the sampler 400 into a square wave signal for supply to the N-bit ADC 1312.

The extracted modulation signal provided by the modulation detection circuit 300 may enable the controller 107: to determine the modulation protocol being used upon first receipt of a modulated RF signal from another near field RF communicator to enable the controller to control subsequent operation of the demodulator in accordance with the determined modulation protocol; to determine the data represented by the extracted modulation, if the modulation protocol being used is known, to enable the controller to act appropriately with respect to data (control data and/or information data) carried by the modulated RF signal, that is to act in accordance with any instruction data and to store any information data in the data store; or to determine the modulation protocol being used and, once this has been determined, to control subsequent operation of the demodulator in accordance with the determined modulation protocol and then to determine the data represented by the extracted modulation and act accordingly. If the modulation detection circuit 300 is used only to enable the controller 107 to determine the modulation protocol being used upon first receipt of a modulated RF signal, then a separate demodulator will be provided which may operate in a different manner.

FIG. 3 shows a functional block diagram of an example of sampler 400 of a modulation detection circuit 300.

As will be understood from the above, the sampler 400 of the modulation detection circuit 300 may have one, two, three or more inputs depending upon the number of different locations from which the received modulated signal may be provided and the number of inputs or samples that may be taken from the same source or location. 'The number of inputs will depend on the circuit and level of detection required. In the interests of clarity only two inputs 308 and 309 are shown in FIG. 3.

In the example shown in FIG. 3, the input 308 is coupled via two parallel switches 303a and 303b and a capacitor 301a to the negative input of an amplifier 306. Similarly the input 309 is coupled via two switches 303c and 303d and a capacitor 301b to the negative input of an amplifier 306.

The other input of the amplifier 306 is coupled to a reference voltage source 310 providing a reference voltage $V_{R1}$. $V_{R1}$ may, for example, be ground or a mid-rail reference or other reference within supply voltage. The output 311 of the amplifier 306 is coupled to a junction J1 between the capacitors 301a and 301b and the negative input of the amplifier 306 via a switch 304. The output 311 of the amplifier 306 is also coupled via a switch 305b to one plate of a second capacitor 302. The other plate of the second capacitor 302 is also coupled to the inverting input of the amplifier 306. The plate of capacitor 302 is also coupled to another reference voltage source 312 via switch 305a providing a reference voltage $V_{R2}$ (which is typically near to mid-rail or some other voltage within the operating range of the amplifier 306) which may be derived from any appropriate voltage in the near field R.F communicator.

The circuit shown in FIG. 3 thus comprises switches 303a, 303b, 303c, 303d, 304, 305a and 305b which may be MOSFET switches or other MOS switches or arty appropriate semiconductor gate or control electrode controlled switches such as bipolar transistors or any other suitable switch, or any appropriate combination of such switches. Although not shown in FIG. 3, the control gates of these switches are coupled to logic circuitry of the clock provider 1301 (FIG. 2a) to cause these switches to be driven between conducting (closed) and non-conducting (open) states in particular switch combinations so that the sampler 400 has a first and second sample states or configurations and is caused to switch between the first and second sample states via an intermediate state The sampler 400 is in the first and second sample states for first and second sample periods, respectively, as determined by the clocking frequency of the clock provider. The first and second sample periods will generally be the same, although they may have a determined duty ratio greater than or less than one.

The operation of the sampler 400 in the first and second sample states will now be explained with the aid of FIGS. 4a and 4b, assuming that, of the two inputs shown, only input 308 is coupled to provide a signal to the modulation detection circuit 300.

Figure 4A:
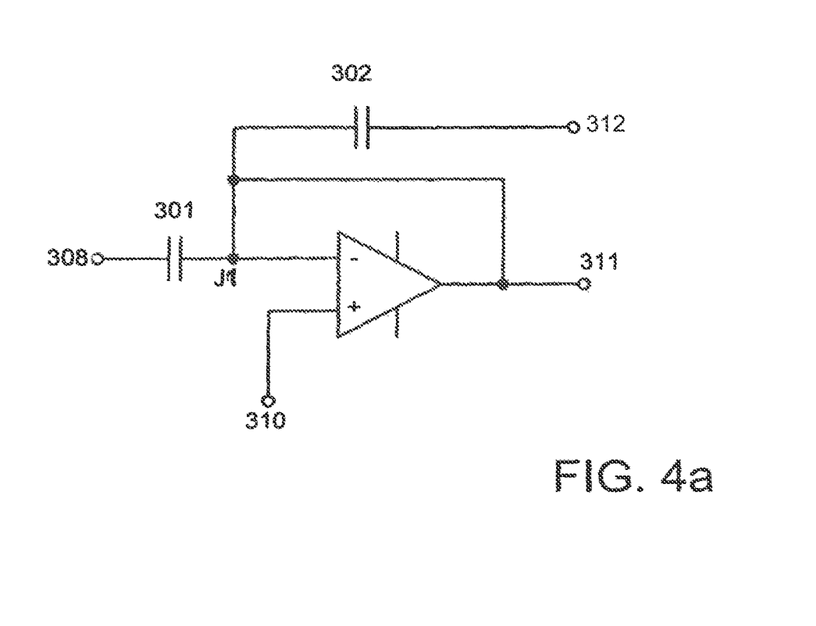
FIG. 4a illustrates one switching configuration or state of the modulation detection circuit shown in FIG. 3.
Figure 4B:
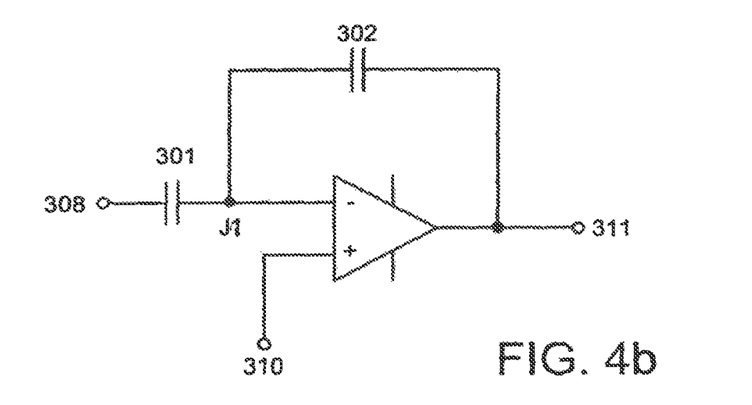
FIG. 4b illustrates in another switching configuration or state of the modulation detection circuit shown in FIG. 3.

The clock provider 1301 is arranged: 1) to cause the switches 303a, 305a, and 304 to be conducting and switches 303b and 305b to be non-conducting in first sample state or configuration as illustrated in FIG. 4a; 2) to cause all switches 303a, 303b, 304, 305a and 305b to be non-conducting in the intermediate state (not shown); and to cause switches 303b and 305b to be conducting and switches 303a, 305a, and 304 to be non-conducting in the second sample state as illustrated in FIG. 4b. As will be appreciated, the intermediate state (not shown) breaks connections before other connections are subsequently made and is employed to maintain the stability of the circuit.

As explained above, the rate of sampling of the modulation detection circuit is determined by the clock signal provided by the clock signal provider 1301. The frequency of the clock signal is selected to be sufficient for enabling modulation detection and/or extraction from an RF signal modulated in accordance with any modulation protocols likely to be used by the transmitting near field RF communicator. Where the envelope of an incoming RF signal may not be known or may be variable, the sampling rate of the modulation detection circuit may be increased. This may be effected under control of the controller 107. For example if the controller fails to receive from the modulation detection circuit a signal representative of extracted modulation when an RF signal is being received, the controller 107 may cause the sampling or clocking frequency to be increased or decreased.

In the first sample state or configuration shown in FIG. 4a, the clock provider causes switches 303a, 305a, and 304 to be conducting and switches 303b and 305b to be non-conducting so that the amplifier 306 is connected as a buffer or unity gain amplifier. This causes the amplifier output and inverting input (and so junction J1) to be driven to a voltage equivalent to the reterence voltage $V_{R1}$ applied at its non-inverting input 310. Over the first sample period, the capacitor 301 accumulates or discharges charge according to the difference between the input voltage Vin at input 308 and the reference voltage $V_{R1}$, with any remnant charge being stored on the capacitor, that is in the first sample period the capacitor 301 "samples" the difference between the input voltage Vin and reference voltage $V_{R1}$.

Over the first sample period the capacitor 302 accumulates charge or partially or fully discharges, depending upon the difference between the reference voltages $V_{R1}$ and $V_{R2}$, that is in the first sample period the capacitor 302 "samples" the difference between the reference voltages $V_{R1}$ and $V_{R2}$. Reference voltage $V_{R2}$ may be the same as or different from reference voltage $V_{R1}$. The actual charge stored by the capacitor 301 in a first sample period is of course dependent on its capacitance the time for which the capacitor is charged during the sample period (the dwell time) and the difference between the input voltage Vin and the reference voltage $V_{R1}$ while the charge stored by the capacitor 302 is dependent on its capacitance, the dwell time and the difference between the reference voltages $V_{R1}$ and $V_{R2}$.

In the second sample state or configuration shown in FIG. 4b, switches 303b and 305b are conducting and switches 303a, 305a, and 304 are non-conducting so that the capacitor 302 is placed in a feedback path of the amplifier. Assuming for simplicity that $V_{R1}$ and $V_{R2}$ are zero or at ground, then any change $\Delta V$ in the input voltage Vin at the input 308 causes a charge $\Delta Q = C_{301} \Delta V$ to shift from capacitor 301 to capacitor 302 resulting in an output signal of $$\frac{C_{301}}{C_{302}}(\Delta V),$$

where $C_{301}$ and $C_{302}$ are the capacitances of capacitors 301 and 302, respectively.

If the reference voltages $V_{R1}$ and $V_{R2}$ are not zero then an offset will be applied to the output voltage in dependence upon the difference of these voltages front zero, It will be appreciated from the above, that the clock provider 1301 repeatedly or cyclically "clocks" the sampler 400 from first state to second state to first state to second state and so on (going through the intermediate state between the other two states).

As described above, the sampler 400 provides an output voltage which is determined by the difference between successive samples of the input signal. As another possibility, the input 308 may be switched between a reference input signal (for example an unmodulated RF signal or clock signal at the frequency expected for the carrier of an RF signal received from another near field RF communicator) so as, effectively, to remove the signal carrier and thus extract the modulation.

In this example, the output 311 is coupled to the voltage detector (possibly via an amplifier and /or Schmitt trigger) which compares the change in voltage or rate of change in voltage to one or more thresholds and outputs a signal representing the extracted modulation. In this example, the voltage detector is an N-bit digitizer such as an ADC which compares the voltage output of the sampler 400 to provide a digital output signal representing the extracted modulation for the controller 107.

The extracted modulation signal provided by the modulation detection circuit 300 may enable the controller 107 (by examining the frequency of occurrence of and pattern of the 1s and 0s representing the extracted modulation) to determine, upon first receipt of a modulated RF signal from another near field RF communicator, the modulation protocol being used. The controller may control subsequent operation of the demodulator in accordance with the determined modulation protocol. Once the modulation protocol has been determined (or if the modulation protocol is known), the controller may determine the data represented by the extracted modulation from the extracted modulation signal.

Figure 5:
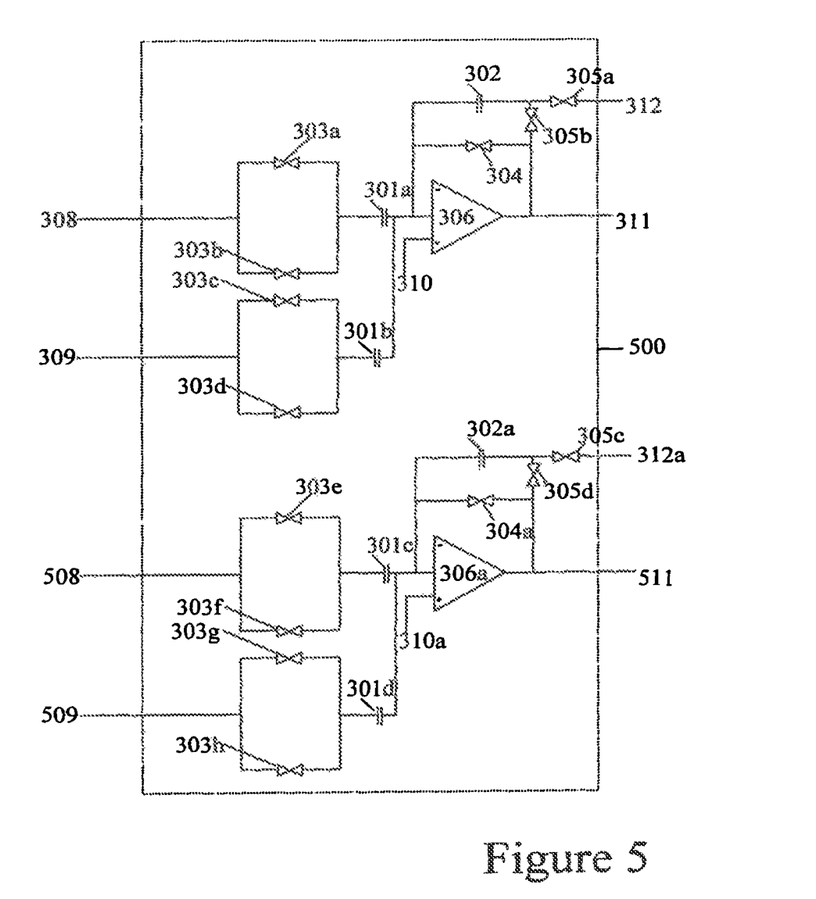
FIG. 5 shows a functional block diagram of another modulation detection circuit embodying the invention.

In FIG. 3 two inputs are shown. In some examples the modulation detection circuit may have fewer or more inputs depending on the available RF signal sources. In examples multiple inputs may be used, from the same input source or different input sources. Likewise differential inputs may be used (i.e. where differential inputs are the inverse of first set of inputs). An example of a differential circuit is shown in FIG. 5 and will be described below. As described, each input is coupled to a respective capacitor 301 via an input circuit having one or more switches. The switches of additional or alternative inputs may operate in a substantially similar fashion to the above described operation of switches 303a and 303b. However, additional or alternative inputs may have other switching requirements and in some examples may need to be coupled to capacitor 301 separately from other inputs 308 and 309. Optionally switches on additional inputs may be controlled independently of the other input switches 303a, 303b, 303c and 303d or in conjunction with them or in response to a control condition or a condition of a signal. Switching of the inputs may be performed independently or may be coupled. The same switching scheme may applied to all the inputs. In other examples switching schemes may be applied to one or more of the inputs according to a condition of the signal on one or more of the inputs.

Capacitors 301 and 302 may be scaled relative to each other in order to adjust the sensitivity of the circuit.

As mentioned above, additional input circuits similar to switches 303a and 303b and capacitors 301a and 301b may also be employed to connect additional inputs to the amplifier 306. The capacitances of the sample capacitors (301a and 301b in FIG. 3) may be scaled to give different gains for different inputs.

In FIG. 3 two switches are shown for each input, in other examples a single switch may be used, although the use of two switches does provide the advantage of enabling "break before make".

Where an input signal is taken from an envelope detector or other source having similar slew characteristics, the slew rate of the signal and thus the rise time and/or fall time of the envelope may be controlled using a controlled slew device. in these examples, the sampling period or frequency may be kept consistent or may be varied. Advantageously the addition of a controlled slew mitigates or removes requirements placed on circuit design by potential envelope gap undershoots or overshoots.

As described above, the antenna circuit has a single-ended configuration. The invention may be configured to operate with differential, complementary positive and negative swinging signals. In these examples the n-bit digitizer may be a differential digitizer or may be a single-ended digitizer.

FIG. 5 shows an example of a modulation detection circuit with differential input and output. Inputs 508 and 509 are coupled to signals which are the inverse of or complementary to the signals coupled to inputs 308 and 309, for example inputs 308 and 508 may be coupled to respective outputs of a differential output antenna circuit. All inputs go into sampler 500 which has the same functionality as sampler 400 in FIG. 3 but in duplicate. Hence 303e-h equate to 303a-d, 301c and 301d equate to 301a and 301b, amplifier 306a equates to amplifier 306 in FIG. 3 etc. It should be clear to the skilled man that any number of multiples of sampler 400 could be used, depending on the number of inputs available and number of outputs required to be processed. As an alternative to using two amplifiers 306 and 306a in FIG. 5, a differential amplifier could instead be used. The differential outputs may be supplied to differential inputs of an n-bit digitizer.

In order to increase the speed of detection, the controller may cause switching between input circuits (for example input circuit 308, 303a, 303b and input circuit 309, 303c, 303d in FIG. 3) such that alternate samples are taken from alternate input circuits. Generally the same input signal may be supplied to both input circuits although this need not necessarily be the case An embodiment provides a near field RF communicator having an inductive coupler to couple inductively to an H field of an RF signal from another near field RF communicator in near field range to provide a received signal, a demodulator coupled to extract any modulation from a source signal representing a received RF signal to provide an extracted modulation signal; and a controller coupled to receive an extracted modulation signal from the demodulator. The demodulator has a sampler to sample the source signal in sampling periods and to compare signal samples with at least one of other signal samples and a clock or reference signal to remove or reject the carrier of the received RF signal and to extract the modulation.

An embodiment of the invention enables, depending upon the sampling rate, many different types of modulation to be detected whereas the peak/ trough system is dependent on comparison against a set threshold which can mean for example 10% modulation may not be detected.

CONCLUSION

As described above, the near field RF communicator is an NFC communicator. It will be apparent to one of ordinary skill in the art that the invention may be implemented in any near field RF communicator and has particular advantages where quick detection of modulation scheme is required or where a near field RF communicator is required to respond to multiple modulation protocols or schemes.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of arty other of the embodiments. Furthermore, equivalents and modifications not described above may also be employed without departing from the scope of the invention, which is defined in the accompanying claims.

What is claimed is:

1. A near field communications (NFC) device, comprising:
   a demodulator, including a first capacitor and a second capacitor, configured to:
   sample a received signal over a first period to provide a first sample, store a first charge on the first capacitor, the stored first charge being related to the first sample and a first reference voltage; and store a second charge on the second capacitor, the stored second charge being related to the first reference voltage and to a second reference voltage in a first sampling configuration; and
   sample the received signal over a second period to provide a second sample in a second sampling configuration, wherein a change in the received signal between the first sample and the second sample causes charge to move from the first capacitor to the second capacitor to provide an output voltage representing the change in the received signal between the first sampling configuration and the second sampling configuration; and a controller configured to adjust a configuration of the demodulator between the first sampling configuration and the second sampling configuration, wherein the output voltage is a result of a capacitive charge transfer within the demodulator between the first capacitor and the second capacitor as the demodulator configuration is adjusted between the first sampling configuration and the second sampling configuration.

2. The NFC device of claim 1, wherein the demodulator comprises:
  a voltage detector module configured to provide an output signal representative of the output voltage when the output voltage exceeds a threshold voltage.

3. The NFC device of claim 1, wherein the first period and the second period are different time periods.

4. The NFC device of claim 2, wherein the controller is further configured to adjust the threshold voltage based on a modulation protocol of the received signal or a modulation width of the received signal.

5. The NFC device of claim 1, wherein the demodulator comprises:
  a sampler including the first capacitor and the second capacitor.

6. The NFC device of claim 1, wherein the controller is further configured to switch the demodulator configuration between the first sampling configuration, a non-sampling configuration, and the second sampling configuration.

7. The NFC device of claim 2, wherein the voltage detector module comprises:
  an analog-to-digital converter (ADC), and
  wherein the output signal comprises:
    a digital signal.

8. A near field communications (NFC) device, comprising:
  a demodulator configured to:
    sample a received signal for a first sampling period to provide a first sample and store a first charge related to the first sample and a second charge related to a reference voltage in a first configuration, and
    sample the received signal for a second sampling period to provide a second sample in a second configuration,
    wherein a change in the received signal between the first sample and the second sample causes a capacitive charge transfer of the stored charge to the stored second charge to provide an output voltage representing the change in the received signal between the first configuration and the second configuration,
  a controller configured to adjust a configuration of the demodulator from the first configuration to the second configuration.

9. The NFC device of claim 8, wherein the demodulator comprises:
  a voltage detector module configured to provide an output signal representative of the output voltage when the output voltage exceeds a threshold voltage.

10. The NFC device of claim 8, wherein the first sampling period and the second sampling period are different time periods.

11. The NFC device of claim 9, wherein the controller is further configured to adjust the threshold voltage based on a modulation protocol of the received signal or a modulation width of the received signal.

12. The NFC device of claim 8, wherein the demodulator comprises:
  a sampler including a first capacitor and a second capacitor,
  wherein the first capacitor is configured to store the first charge, and
  wherein the second capacitor is configured to store the second charge.

13. The NFC device of claim 8, wherein the controller is further configured to switch the demodulator configuration between the first configuration, a non-sampling configuration, and the second configuration.

14. The NFC device of claim 9, wherein the voltage detector module comprises:
  an analog-to-digital converter (ADC), and
  wherein the output signal comprises:
    a digital signal.

15. A near field communications (NFC) device, comprising:
  a demodulator, including a first capacitor and second capacitor configured to:
  sample a received signal over a first period to provide a first sample, store a first charge on the first capacitor, the stored first charge being related to the first sample and a first reference voltage; and store a second charge on the second capacitor, the stored second charge being related to the first reference voltage and to a second reference voltage in a first sampling configuration; and
  sample the received signal over a second period to provide a second sample in a second sampling configuration,
  wherein a change in the received signal between the first sample and the second sample causes charge to move from the first capacitor to the second capacitor to provide an output voltage representing the change in the received signal between the first sampling configuration and the second sampling configuration;
  provide an output signal representative of the output voltage when the output voltage exceeds a threshold voltage; and
  a controller configured to adjust the demodulator configuration between the first sampling configuration and the second sampling configuration,
  wherein the output voltage is a result of a capacitive charge transfer within the demodulator between the first capacitor and the second capacitor as the demodulator configuration is adjusted between the first sampling configuration and the second sampling configuration.

16. The NFC device of claim 15, wherein the demodulator comprises: an analog-to-digital converter (ADC) configured to provide the output signal.

17. The NFC device of claim 15, wherein the first period and the second period are different time periods.

18. The NFC device of claim 16, wherein the controller is further configured to adjust the threshold voltage based on a modulation protocol of the received signal or a modulation width of the received signal.

19. The NFC device of claim 15, wherein the demodulator comprises:
  a sampler including the first capacitor and the second capacitor.

20. The NFC device of claim 15, wherein the controller is further configured to switch the demodulator configuration between the first sampling configuration, a non-sampling configuration, and the second sampling configuration.

* * * * *